(No Model.)

H. WESTBROOK & R. BURNS.
SCREW CUTTING DEVICE.

No. 430,358. Patented June 17, 1890.

WITNESSES:

INVENTOR:
H. Westbrook
R. Burns
BY
Munn & Co.
ATTORNEYS

UNITED STATES PATENT OFFICE.

HENRY WESTBROOK AND ROBERT BURNS, OF WOODSTOCK, ONTARIO, CANADA.

SCREW-CUTTING DEVICE.

SPECIFICATION forming part of Letters Patent No. 430,358, dated June 17, 1890.

Application filed November 11, 1889. Serial No. 329,926. (No model.)

*To all whom it may concern:*

Be it known that we, HENRY WESTBROOK and ROBERT BURNS, both of Woodstock, in the county of Oxford, Province of Ontario, and Dominion of Canada, have invented a new and Improved Screw-Cutting Head, of which the following is a full, clear, and exact description.

The invention relates to dies for cutting screw-threads; and its object is to provide a new and improved screw-cutting head which is simple and durable in construction, adapted to cut a short, clean, and solid thread, and requiring very little driving-power.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1:
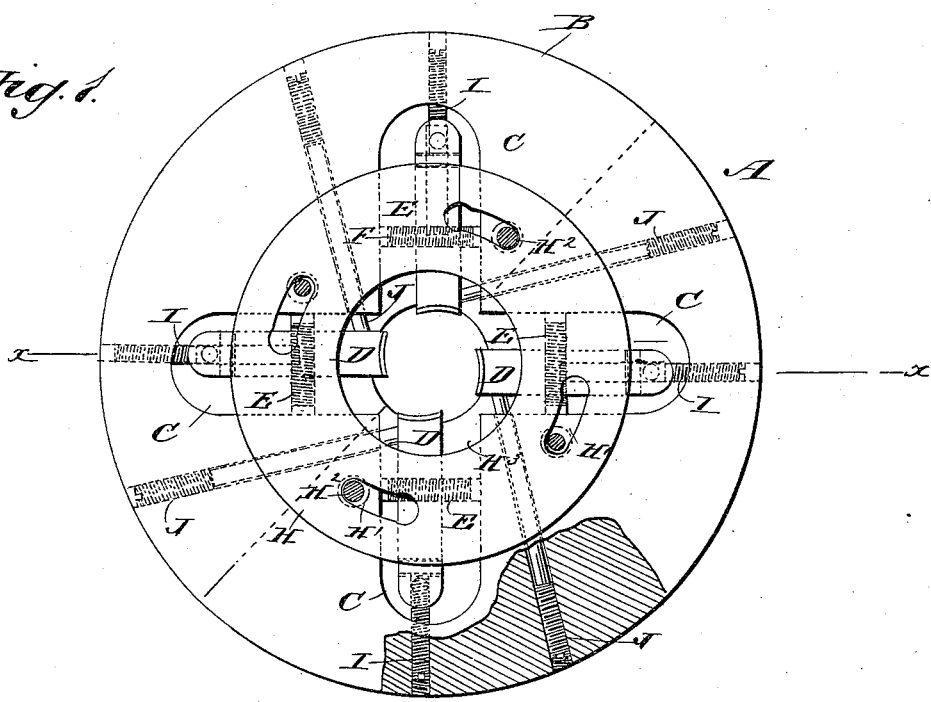
Figure 2:
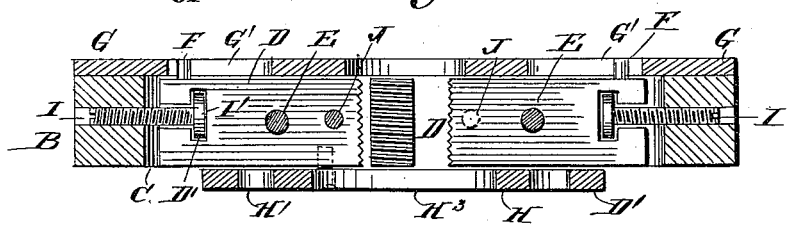
Figure 3:
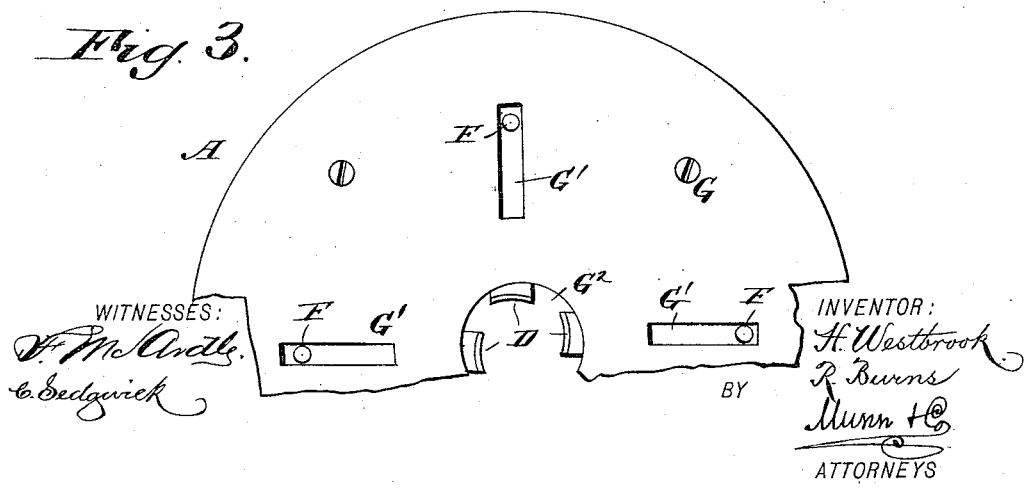

Figure 1 is a front view of the improvement with parts in section. Fig. 2 is a sectional plan view of the same on the line $x\ x$ of Fig. 1, and Fig. 3 is a rear face view of part of the improvement.

The improved screw-cutting head A is provided with the circular plate B, having a series of recesses C, in which are held screw-cutting dies D, each of which is provided with a screw E, resting with its ends against the walls of the recess C, so that when the screw is turned the die D is adjusted transversely. On the rear of each die D is secured or formed a pin F, which projects into a radial slot $G'$, formed in the plate G, secured by screws or other means to the rear face of the plate B, as is plainly shown in Figs. 2 and 3. The pin F is arranged a suitable distance outward from the screw E, and forms the fulcrum for the die D, when the latter is adjusted sidewise by turning the screw E.

The dies D are held in place on the front of the plate B by a circular plate H, provided with the usual segmental slots $H'$, through which pass the bolts $H^2$ for screwing in the plate B and serving to secure the said plate H in position on the plate B. One end of each slot $H'$ is enlarged for the passage of the head of the screw or bolt $H^2$, so that the plate H can be removed whenever desired. The plate H, as well as the plate G, is provided with the usual central openings for the admission of the work. Each die D is adapted to be moved inward or outward by a screw I, screwing radially in the plate B, and provided at its inner end with a head $I'$, and engaging a T-slot $D'$, formed in the die D, so that when the screw I is turned the head $I'$ moves the die inward or outward, according to the direction in which the screw I is turned. The cutting end of each die D rests against a screw J, screwing in the plate B and passing into the recess C near the inner end of the die, as is plainly shown in Fig. 1, so that when the die cuts the strain is taken up by the screws J.

It will be seen that by turning the screws E the cutting-edge of the die can be adjusted so that one edge engages the work throughout its length, thereby acting on the work in the same manner as an ordinary turning-tool held in the stock of the lathe. This arrangement avoids the grubbing of the work, which usually occurs in the die-heads at present in use. As each cutting-edge of the die engages the work evenly and uniformly, a solid clean thread is cut. The full thickness of the steel of the die is used for cutting purposes, and the cutting-edge is set up to the work by adjusting the screws I.

The cutting-edges of the dies D are segmental, the radius being the same for each die. The dies are set with their cutting-edges to one side of the center of the circular plate A B by means of the screws E, and as plainly shown in Fig. 1. It will be seen that the dies can be so adjusted inward or outward by the screws I that bolts of varying diameter can be cut, the number of threads to the inch, however, being the same in a smaller or larger bolt. The dies are adapted to cut any desired length of thread, as they can be used on any automatic bolt-cutter or for hand-dies.

The head can be made in two segmental parts, as indicated by dotted lines in Fig. 1, and hinged or otherwise fastened together, so as to permit of opening the head for removing the bolt after the desired length of thread is cut on the bolt.

Having thus fully described our invention, we claim as new and desire to secure by Letters Patent—

1. In a screw-cutting head, the combination, with a plate provided with recesses, of dies held longitudinally adjustable therein, and screws screwing into the dies and having their ends resting against the walls of the recesses, substantially as and for the purpose specified.

2. In a screw-cutting head, the combination, with a plate having recesses and radial slots, of dies held in the said recesses and each provided with a pivot engaging the said radial slots, and a screw resting with its ends on the walls of the die-recess and screwing in the said die, substantially as shown and described.

3. In a screw-cutting head, the combination, with a plate having recesses and radial slots, of dies held in the said recesses and each provided with a pivot engaging the said radial slots, a screw resting with its ends on the walls of the die-recess and screwing in the said die, and a screw screwing in the said plate for adjusting each die inwardly or outwardly, substantially as shown and described.

4. In a screw-cutting head, the combination, with a plate provided with recesses and longitudinally and transversely adjustable dies in said recesses, of a screw screwing into the plate and having their ends projecting into the recesses adjacent to the inner ends of the dies, whereby provision is made for relieving the dies of strain, as set forth.

5. In a screw-cutting head, the combination, with a plate having recesses and radial slots, of dies held in the said recesses and each provided with a pivot engaging the said radial slots, a screw resting with its ends on the walls of the die-recess and screwing in the said die, and screws screwing in the said plate and abutting against the said dies, substantially as shown and described.

HENRY WESTBROOK.
ROBERT BURNS.

Witnesses:
H. E. REVELL,
R. M. REVELL.